US009288163B2

(12) United States Patent
Arramreddy et al.

(10) Patent No.: US 9,288,163 B2
(45) Date of Patent: Mar. 15, 2016

(54) LOW-LATENCY PACKET RECEIVE METHOD FOR NETWORKING DEVICES

(71) Applicant: Emulex Design & Manufacturing Corporation, Costa Mesa, CA (US)

(72) Inventors: Sujith Arramreddy, Saratoga, CA (US); Ashwin Kamath, Cedar Park, TX (US); Anthony Hurson, Austin, TX (US); Ravindra S. Shenoy, Sunnyvale, CA (US); Chaitanya Tumuluri, Mountain View, CA (US); Ganesh Boddapati, Austin, TX (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 386 days.

(21) Appl. No.: 13/843,021

(22) Filed: Mar. 15, 2013

(65) Prior Publication Data

US 2014/0280674 A1    Sep. 18, 2014

(51) Int. Cl.
*H04L 12/861* (2013.01)
*G06F 9/455* (2006.01)
*H04L 12/863* (2013.01)
*H04L 12/879* (2013.01)

(52) U.S. Cl.
CPC ...... *H04L 49/90* (2013.01); *G06F 2009/45583* (2013.01); *G06F 2212/7203* (2013.01); *H04L 47/6215* (2013.01); *H04L 49/901* (2013.01)

(58) Field of Classification Search
USPC .......................................................... 709/213
See application file for complete search history.

(56) References Cited

U.S. PATENT DOCUMENTS

| | | | |
|---|---|---|---|
| 4,449,182 A | | 5/1984 | Rubinson et al. |
| 5,487,152 A * | | 1/1996 | Young ........................... 709/236 |
| 5,657,471 A * | | 8/1997 | Lary ..................... G06F 13/126 711/154 |
| 5,812,775 A * | | 9/1998 | Van Seters et al. ........... 709/213 |
| 6,243,783 B1 * | | 6/2001 | Smyers et al. ................. 710/310 |
| 6,496,916 B1 * | | 12/2002 | Fadavi-Ardekani ..... G11C 8/12 710/40 |
| 6,529,945 B1 * | | 3/2003 | Calhoun et al. ............... 709/213 |
| 7,133,902 B2 * | | 11/2006 | Saha et al. ..................... 709/212 |
| 7,606,978 B2 * | | 10/2009 | Landin et al. ................. 711/141 |
| 7,624,157 B2 * | | 11/2009 | David et al. ................... 709/215 |
| 7,843,906 B1 * | | 11/2010 | Chidambaram .... H04L 47/6205 370/386 |
| 8,250,586 B2 * | | 8/2012 | Nelson ................ G06F 9/45533 711/148 |
| 8,619,800 B1 * | | 12/2013 | Finney ................ H04L 49/9042 370/392 |
| 2002/0161846 A1 * | | 10/2002 | Ulrich et al. ................... 709/213 |
| 2004/0205319 A1 * | | 10/2004 | Pickreign et al. ............. 711/202 |
| 2005/0086448 A1 * | | 4/2005 | Anand .................. G06F 12/023 711/170 |
| 2005/0108399 A1 * | | 5/2005 | Bouknight, Jr. ........ H04L 47/36 709/226 |
| 2005/0213603 A1 * | | 9/2005 | Karighattam ........... H04L 49/90 370/463 |
| 2006/0248234 A1 * | | 11/2006 | Pope ....................... H04L 49/90 709/250 |
| 2006/0288129 A1 * | | 12/2006 | Pope ...................... G06F 13/28 710/22 |

(Continued)

*Primary Examiner* — Backhean Tiv

(57) ABSTRACT

When interfacing with a host, a networking device can handle a first data like Bulk Data Receive. The networking device can receive the first data and read a first queue entry from a receive queue in the host memory. In response to the read first queue entry, the networking device can write the first data to an unpinned memory in the host memory. The networking device can also handle a second data with a Receive Packet in Ring (RPIR) queue. The networking device can receive the second data and write the second data to a pinned memory in the host memory. The RPIR queue can be separate from or overlaid on the receive queue. High throughput and low-latency operation can be achieved. The use of a RPIR queue can facilitate the efficiency of resource utilization in the reception of data messages.

16 Claims, 7 Drawing Sheets

(56) References Cited

U.S. PATENT DOCUMENTS

| | | | | |
|---|---|---|---|---|
| 2007/0067771 A1* | 3/2007 | Kulbak | G06F 9/4843 | 718/100 |
| 2008/0028103 A1* | 1/2008 | Schlansker | H04L 49/90 | 709/250 |
| 2008/0052441 A1* | 2/2008 | Freking | G06F 13/385 | 710/310 |
| 2008/0091915 A1* | 4/2008 | Moertl | G06F 12/145 | 711/206 |
| 2008/0148005 A1* | 6/2008 | Moertl | G06F 12/1081 | 711/202 |
| 2008/0263307 A1* | 10/2008 | Adachi | G06F 13/1605 | 711/171 |
| 2010/0153592 A1* | 6/2010 | Freimuth | G06F 13/4022 | 710/38 |
| 2011/0072199 A1* | 3/2011 | Reiter | G06F 13/14 | 711/103 |
| 2011/0161552 A1* | 6/2011 | Lund | G06F 12/0246 | 711/103 |
| 2013/0247056 A1* | 9/2013 | Hattori | G06F 9/5077 | 718/102 |
| 2014/0047060 A1* | 2/2014 | Chen et al. | 709/213 | |
| 2014/0201305 A1* | 7/2014 | Dalal et al. | 709/212 | |

* cited by examiner

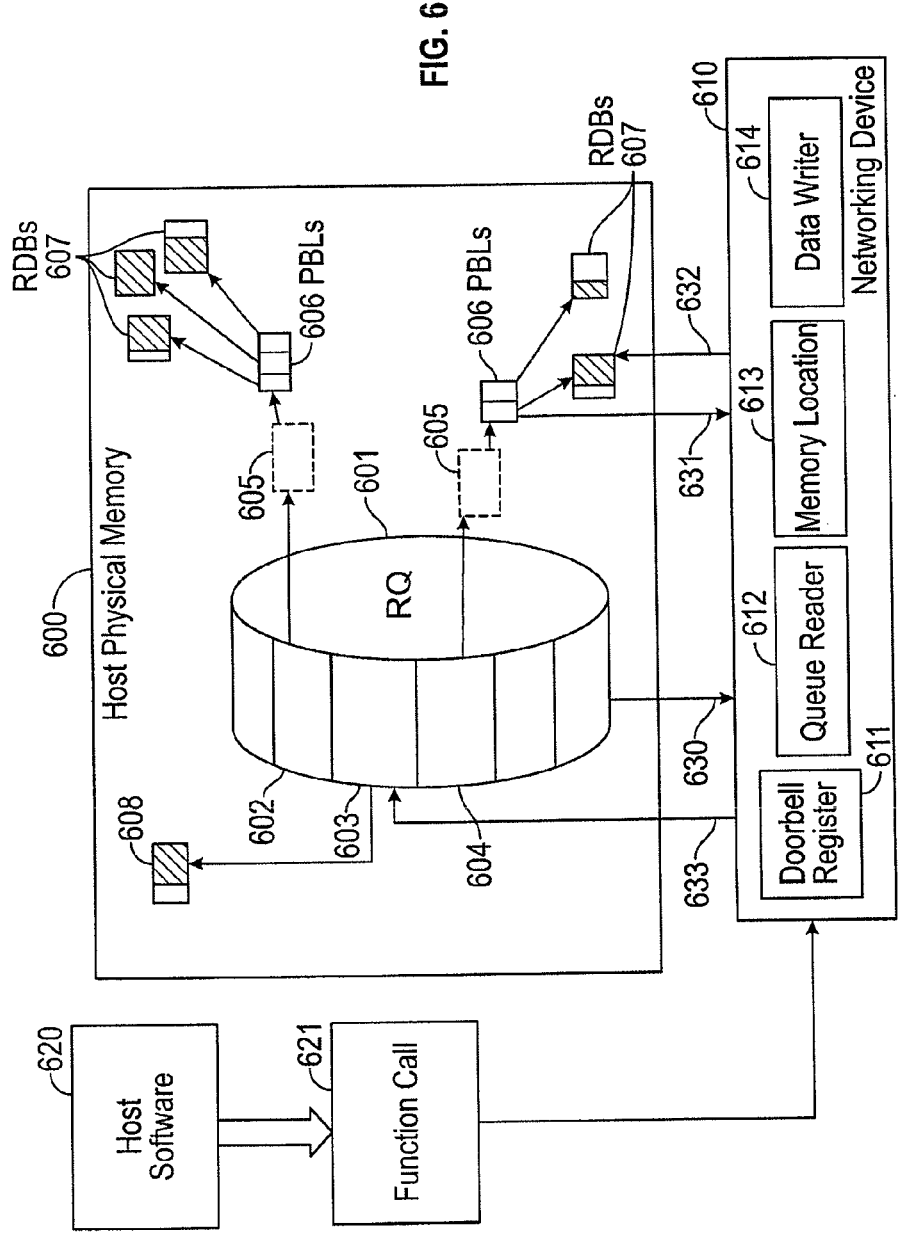

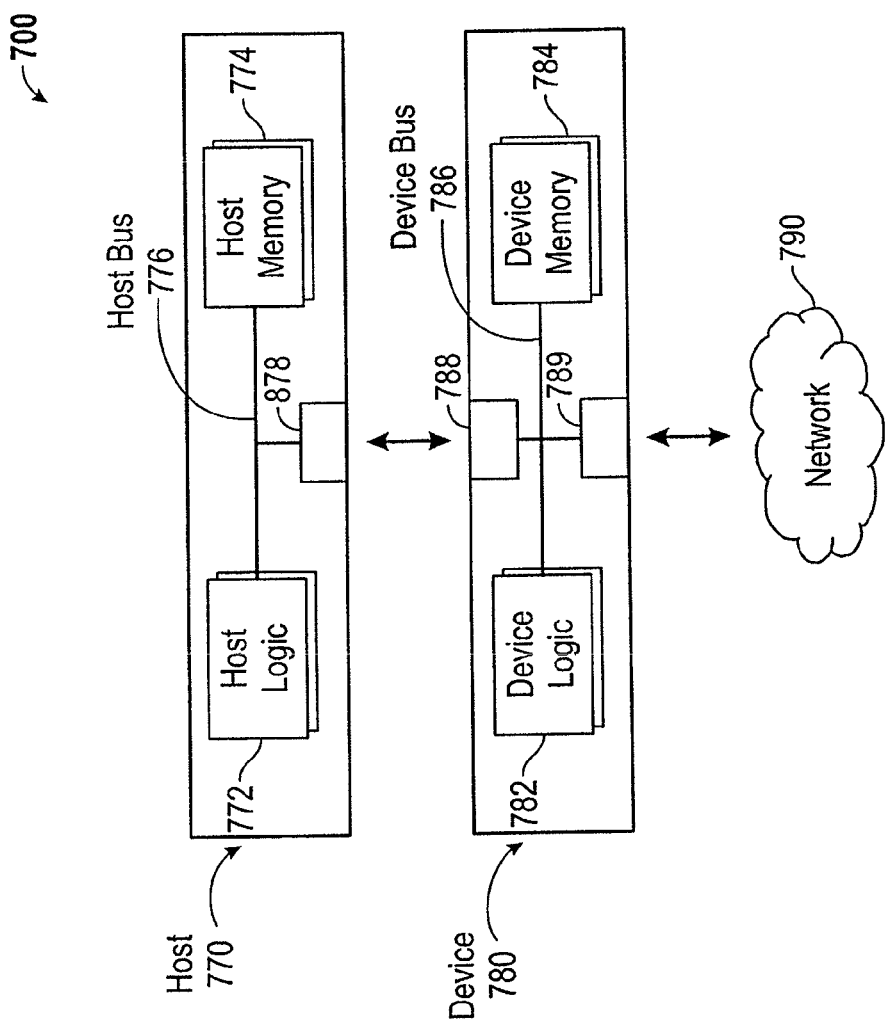

LOW-LATENCY PACKET RECEIVE METHOD FOR NETWORKING DEVICES

FIELD OF THE DISCLOSURE

This relates generally to data communication in networks, and more specifically to receiving packet data at endpoint node with low latency and high bandwidth.

BACKGROUND OF THE DISCLOSURE

Latency can be described as the amount of time it takes for a packet of data to propagate from a transmitter to a receiver. The total latency can include overhead for time spent sending and receiving commands, executing reads and writes, and performing additional functions to ensure that the data can reach the correct destination without errors. For large data messages, achieving large bandwidth can be critical, whereas low latency can be important for small data messages. Reducing the overhead and therefore the overall latency time for small data messages can help lead to better performance and faster communication in networks and message-based applications.

SUMMARY OF THE DISCLOSURE

This relates to methods and techniques to manage receiving packet data. Examples of this disclosure can be used to achieve both high throughput and low-latency operation. The exemplary teachings of the disclosure can describe the use of a Receive Packet in Ring (RPIR) queue, which can facilitate the efficiency of resource utilization in the reception of data messages.

A networking device can interface with a host memory by handling a first data in a certain way. The networking device may comprise logic providing various functions, including those of an interface, a queue reader, and a data writer. The interface can receive the first data. The queue reader can read a first queue entry from a receive queue in the host memory. In response to the read first queue entry, the data writer can write the first data to an unpinned memory in the host memory. These teachings can contribute to Bulk Data Receive functionality.

The networking device can interface with the host memory by also handling a second data, yet in a different way. The interface can also receive the second data. The data write can write the second data to a pinned memory in the host memory. These teachings can contribute to Receive Packet in Ring functionality.

In some examples, the pinned memory can be a data buffer queue. The data writer can write the second data to the data buffer queue at a data buffer queue element corresponding to a second queue entry of the receive queue. Through these teachings, the RPIR queue can be separate from the receive queue.

In other examples, the pinned memory can be the receive queue itself. The data writer can write the second data to the receive queue. Through these teachings, the RPIR queue can be overlaid on the receive queue.

The networking device may be incorporated in a networking adapter (e.g., a NIC, an Ethernet card, a host bus adapter (HBA), a CNA) or in a host. The host may incorporate the networking adapter. The various examples may be provided in a network, as well. Additional examples include machine-readable media that implement the methods of this disclosure.

BRIEF DESCRIPTION OF THE DRAWINGS

FIG. 6 illustrates an exemplary networking device receiving communication from host software and performing reads and writes with a receive queue whose functionality has been overlaid with the functionality of a receive packet in ring queue located in host memory.

FIG. 7 illustrates an exemplary networking system that can be used with one or more examples of this disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to methods and techniques to manage the receiving of packet data in networking systems for both high throughput and low-latency operation, for applications such as high performance computing and message-based applications. A solution to achieving lower latency when receiving small data messages in networking devices can be to utilize a Receive Packet in Ring queue. Examples of the disclosure can be used to achieve high performance with low overhead time and low overall latency when a networking device receives a small data message, and to achieve high bandwidth when a networking device receives a large data message.

Achieving low latency and high bandwidth for data sent in a network can be an important aspect of proper network operation. Managing the way a data packet is received can help, for example, to reduce latency, which is defined herein as the total time measured from the start of a data packet transmitted from a networking endpoint or node to when the data packet has been received at another networking endpoint or node. This management can have significant impact on the performance of the network, particularly for communications numbering in the low thousands, or higher.

Figure 1:
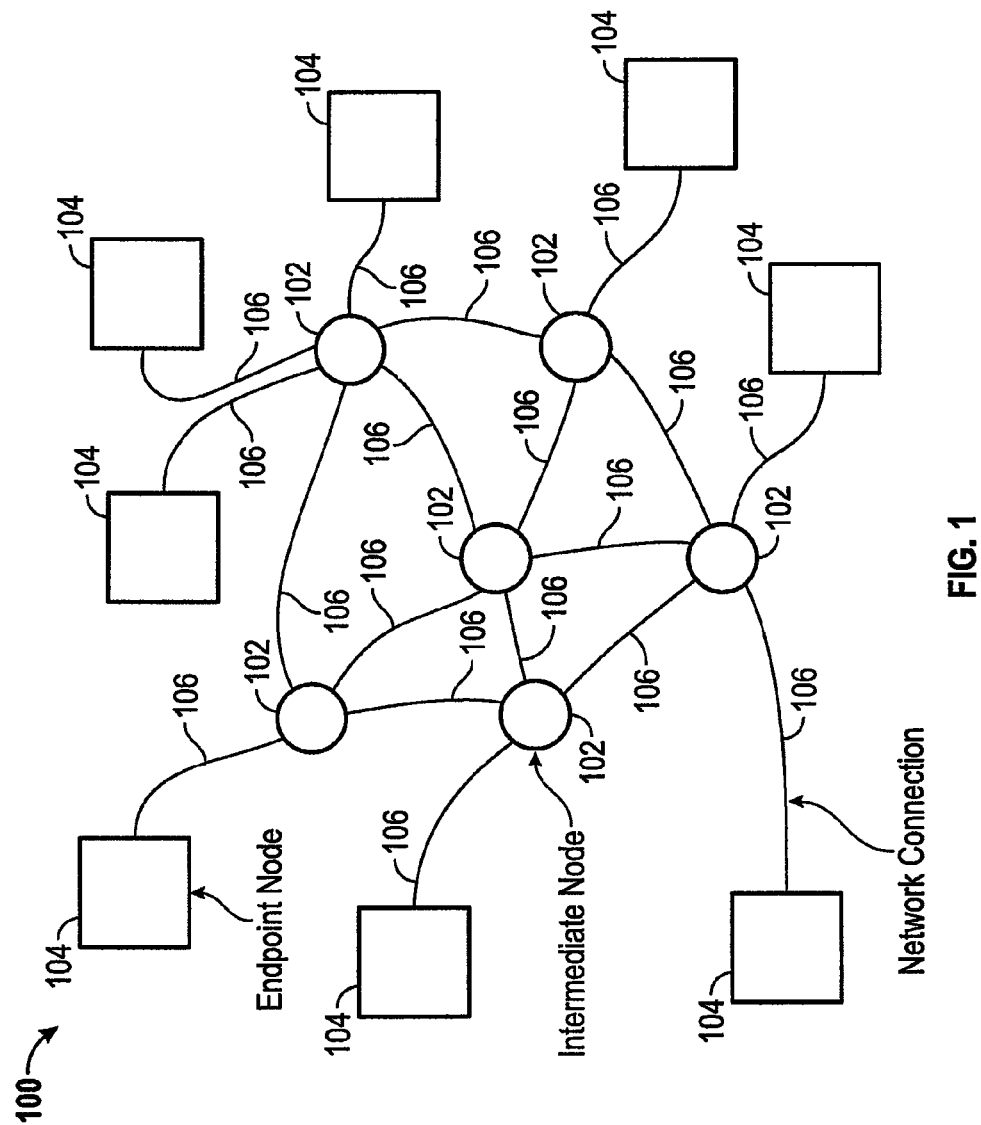
FIG. 1 illustrates an exemplary network in which some of the examples of this disclosure may be practiced.

FIG. 1 illustrates an exemplary network 100 in which some of the examples of this disclosure may be practiced. The network 100 can include various intermediate nodes 102. These intermediate nodes 102 can be switches, hubs, or other devices. The network 100 can also include various endpoint nodes 104. These endpoint nodes 104 can be computers, mobile devices, servers, storage devices, or other devices. The intermediate nodes 102 can be connected to other intermediate nodes and endpoint nodes 104 by way of various network connections 106. These network connections 106 can be, for example, Ethernet-based, Fibre Channel-based, or can be based on any other type of communication protocol.

The endpoint nodes 104 in the network 100 can transmit and receive data to one another through network connections 106 and intermediate nodes 102. However, high latency and long times needed to transmit the data from one endpoint node 104 to an intermediate node 102 or another endpoint node 104 can result under certain circumstances. For example, when the data messages are small in size and multiple data messages are being transmitted, each data message can have an overhead time associated with sending and receiving commands, executing reads and writes, and performing additional functions to ensure that the data can reach the correct destination without errors. The sum of the total overhead time for all the small data messages can constitute a large portion of the total latency time. This, in turn, can result in inefficient communication rates and poor performance.

In a networking system, receiving a packet data can be initiated by host software that notifies the networking device of the host software's readiness to receive packet data through a function call. The host software can maintain one or more queues with entries corresponding to data buffers into which received packet data can be placed. In user mode applications, the software or host CPU may not have direct access to the host physical memory, but instead can reference host physical memory through virtual addresses and pointers. Since the user mode application may not have direct access to physical memory, the function call can be used by the user mode application to convey to the networking device where to store the received packet data through entries in a receive queue that can include corresponding virtual addresses and pointers. When entries are placed on the receive queue, the user mode application can notify the networking device through a doorbell register, located internally in the networking device. When the networking device is available to store the received packet data into host memory, the networking device can read the entry from the one or more queues, translate the virtual addresses and pointers to the corresponding host physical memory addresses, and store the packet data into host physical memory.

Figure 2:
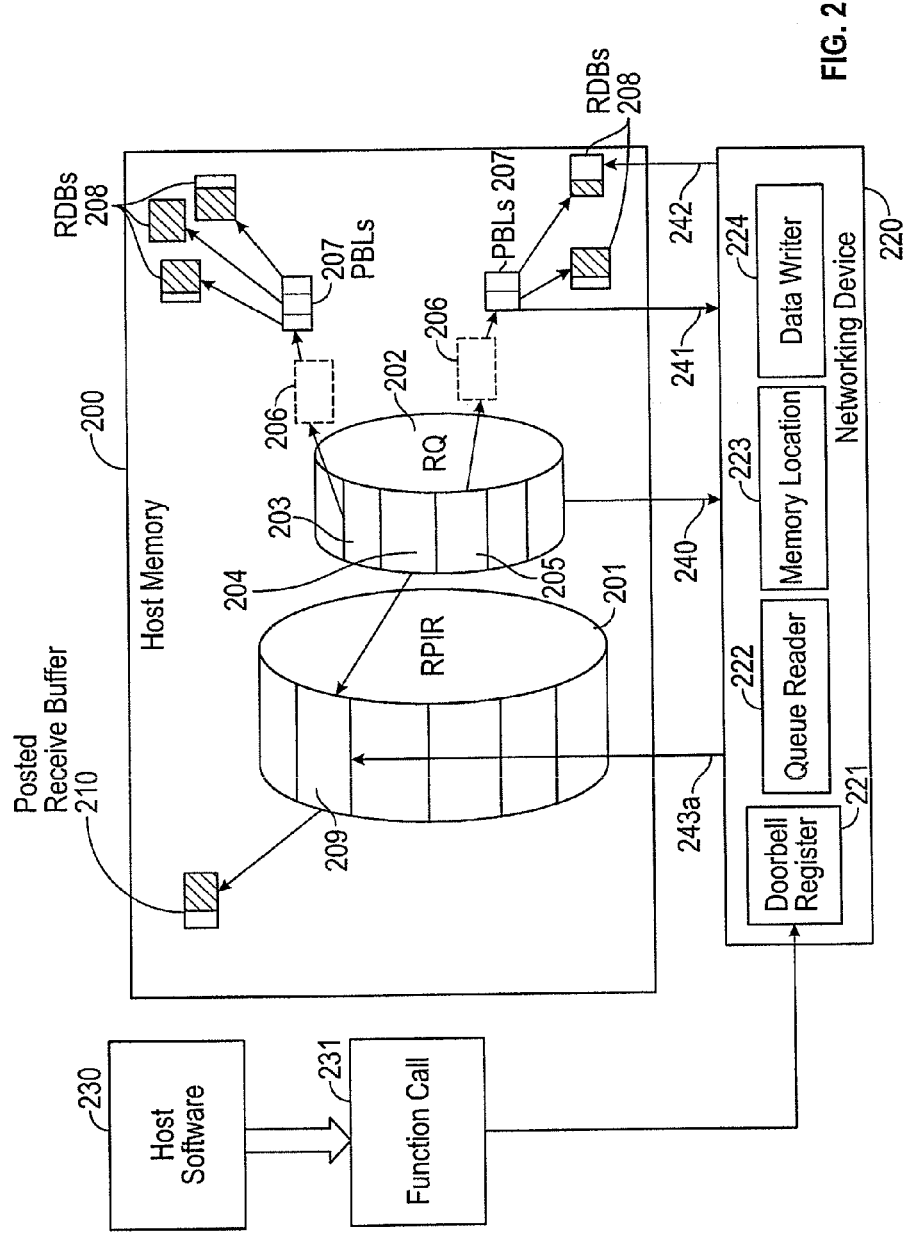
FIG. 2 illustrates an exemplary networking device receiving communication from host software and performing reads and writes with a receive packet in ring queue and a receive queue located in host memory.

FIG. 2 illustrates example queues located in host memory 200. FIG. 2 shows a Receive Queue (RQ) 202, along with an associated Receive Packet In Ring (RPIR) 201. The RPIR 201 and RQ 202 can be circular or non-circular queues and can implement any type of buffering scheme such as First In-First Out (FIFO). Host software can maintain the queues by placing entries, called Work Queue Elements (WQEs) 203/204/205, into the RQ 202. A WQE can comprise a WQE header and one or more Scatter/Gather Elements (SGEs). The WQE header can contain the total byte count or size of the one or more receive data buffers posted by host software. Each SGE contains the host memory address and length of each data buffer. RQ 202 has an associated RPIR 201, which may have the same number of entries as the RQ 202. There can be a 1:1 correspondence between each RPIR entry and each RQ entry. Each RPIR queue element can be a small packet data buffer. If the incoming packet data is small enough, the packet data can be placed in a RPIR element without the need to access information within the associated RQ WQE.

Figure 3:
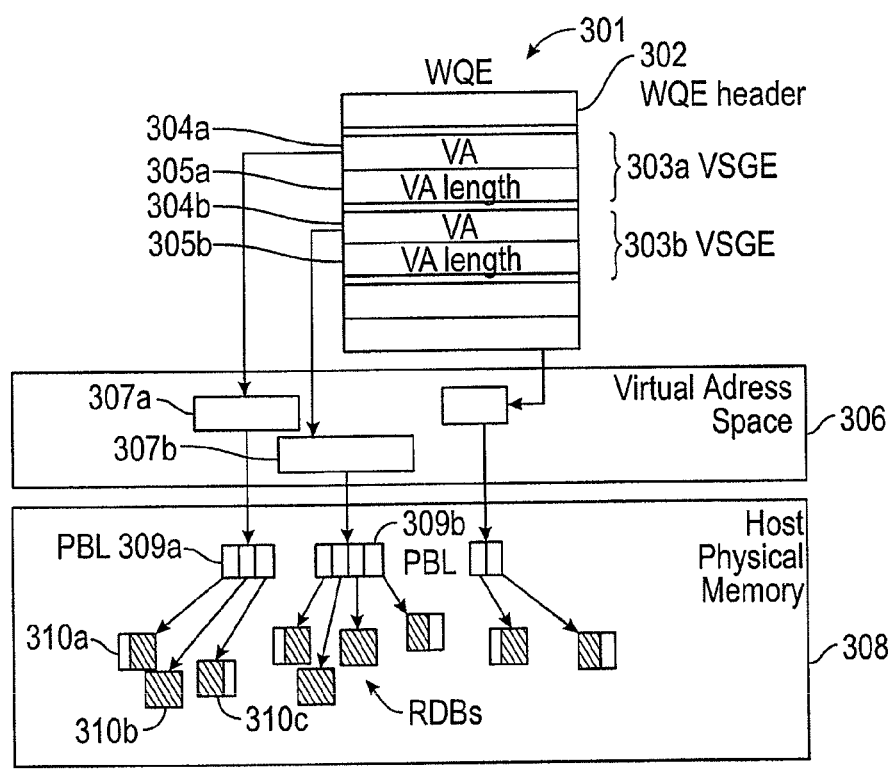
FIG. 3 illustrates an exemplary receive posting for utilizing a receive queue, virtually-addressed scatter/gather elements, and pre-registered physical buffer lists.

An example WQE for large data messages is shown in FIG. 3. The WQE 301 can comprise a WQE header 302, which can include the total byte count or size of the receive data buffers posted by host software, and one or more entries. The entries can include a Virtually-Addressed Scatter/Gather Elements (VSGEs) 303a/303b. A VSGE 303a/303b can contain a virtual address (VA) 304a/304b of a buffer 307a/307b located in virtual address space 306 and the length 304a/304b of the buffer 307a/307b. The use of virtual addresses and the virtual address space can be due to the user mode application not having direct access to physical memory. The virtual buffers 307a/307b can point or correspond to a physical buffer lists (PBLs) 309a/309b located in host physical memory 308. The PBLs can then point to data buffers that the networking device can write to, called receive data buffers (RDBs) 310a/310b/310c. RDB 310a, 310b, 310c can be located at different, non-contiguous host physical address locations, and any byte-aligned address can be assigned. If the receive data message size is larger than a RDB size, the receive data message can be broken up into multiple data packets to spread across multiple RDBs, with a physical buffer list (PBL) comprising multiple entries and an entry pointing to a RDB. In the example shown in FIG. 3, the first VSGE 304a comprises a virtual address of a virtual buffer 307a, which then points to PBL 309a. PBL 309a can be divided into three, which then points to three separate RDBs 310a, 310b, and 310c. In this example, the center RDB 310b is completely full, while the first RDB 310a and the last RBB 310c are not completely full. The PBLs can be located in contiguous memory and RDBs can be located in discontiguous memory.

The WQE format for a small data message can be the same as the WQE format for a large data message. Similar to above, the WQE for a small data message can be placed into RQ 202. Unlike an WQE for a large data message, however, the WQE for a small data message does not need to be accessed by the networking device. A large data message can be placed into RBDs, but a small message can be placed into an RPIR queue element.

Figure 4:
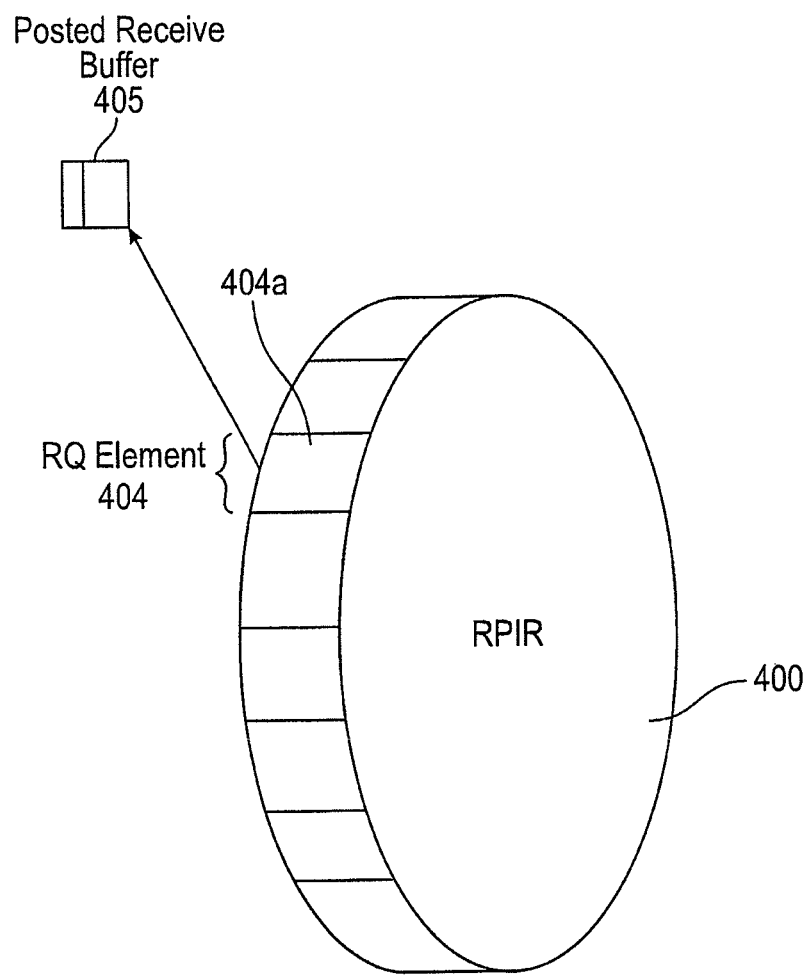
FIG. 4 illustrates an example receive packet in ring.

An example RPIR 400 with a small data message is shown in FIG. 4. Like an RQ, RPIR 400 can be pinned in host memory for device access. RPIR can be pre-configured and statically configurable. For example, the size of a data buffer in the RPIR 400 can be a power-of-two multiple of bytes. The received data packet 404a can be stored by the networking device directly in RPIR element 404. The networking device can notify the host software of the storing of received data packet 404a. The host software can copy received data packet 404a from RPIR element 404 to posted receive buffer 405, where the user mode application can access the copy of received data packet 404a. The RPIR-placed message can introduce an additional copy latency as the host software places the device-written ring data into the actual receive buffer posted by the application. For a small receive message, however, this copy latency is much less than the latency of processing a single message according to all the aspects of FIG. 3 discussed above, which can involve two DMA reads plus address protection/translation overhead.

Referring back to FIG. 2, host software 230 can execute a function call 231. Host software 230 can then create a WQE 203/204/205. If the receive data message is large, the networking device can read a WQE (e.g., 203 or 205) from the RQ. In the WQE, the VSGEs can include a virtual address of a virtual buffer 206 located in virtual space. The virtual buffer 206 can point to or correspond to PBLs 207, and the PBLs can then point to one or more RDBs 208. If the receive data message is small, the networking device does not need to access a WQE (e.g., 204). Because there can be a 1:1 correspondence between each RPIR entry and each RQ entry, WQE 204 as an entry in the RQ 202 can correspond to an entry 209 in the RPIR 201. An RPIR element can contain the entry 209 in the RPIR 201. The entry 209 can comprise the small receive data message. After host software 230 executes a function call 231 and the WQE has been created, the WQE can be stored in the RQ 202, shown as 203, 204, and 205 for receive data messages. Host software can then ring a doorbell in the networking device to notify the networking device of the host software's readiness to receive a data message. Ringing can be done by writing to the doorbell register 221, located internally in the networking device 220. The doorbell register 221 can be a mechanism used to notify the networking device 220 when a new receive message buffer has been posted by host software 230.

When the networking device 220 is ready and available to store a large data message into host memory 200, the networking device 220 can perform a first read of an RQ entry, shown by arrow 240, using the queue reader 222. The contents of the WQE of the read RQ entry can then be validated to ensure compliance, including actions such as checking against pre-registered memory regions and dissecting the WQE. The VSGEs of the WQE can be translated to correspond to a virtual buffer 206 that points to the PBLs 207. The networking device 220 can then perform a second read using the memory location reader 223, shown by arrow 241, to fetch and read the PBLs 207. The entries of the PBLs 207 can point to multiple physical RDBs 208. The networking device 220 can use the information read from the PBLs 207 to know where the packet data of the large data message can be stored in physical memory. The networking device 220 can then perform a write using the data writer 224, shown by arrow 242, by writing the packet data to the RDBs 208. This process for receiving a large data message into the host memory can be described as Bulk Data Receive (BDR).

If the incoming message is small (e.g., does not exceed the buffer size of an RPIR element), the networking device 220 can bypass the whole WQE and PBL fetch and parsing process discussed above. Instead, the networking device 220 can place the small message directly into the RPIR 201. The networking device can perform a write using data writer 224 by writing the packet data of the small message as an entry into the RPIR 201, shown by arrow 243. The host software 230 can write a copy of the packet data to a posted receive buffer 210, which the application can access.

While the example presented in FIG. 3 can be used for storing large data messages, storing small data message according to this example can suffer from high latency from the first and second reads, which can be needed to determine where the data message can be placed in host memory. The large latency can be due to the multiple layers of pointers and virtual addresses and the multiple read operations. While a large data message still encounters latency time that can be higher than the latency time of a small data message, the time spent on overhead may not constitute a significant proportion of its total latency time. In contrast, for a small data message, the time spent on overhead can consume a significant proportion of its total latency time. To improve the efficiency of resource utilization, small data messages can be stored directly into physical host memory on an RPIR queue. By directly placing the small data messages on the RPIR, the overhead and latency can be reduced by bypassing the two reads and the VSGE address translation steps used for large messages.

Figure 5:
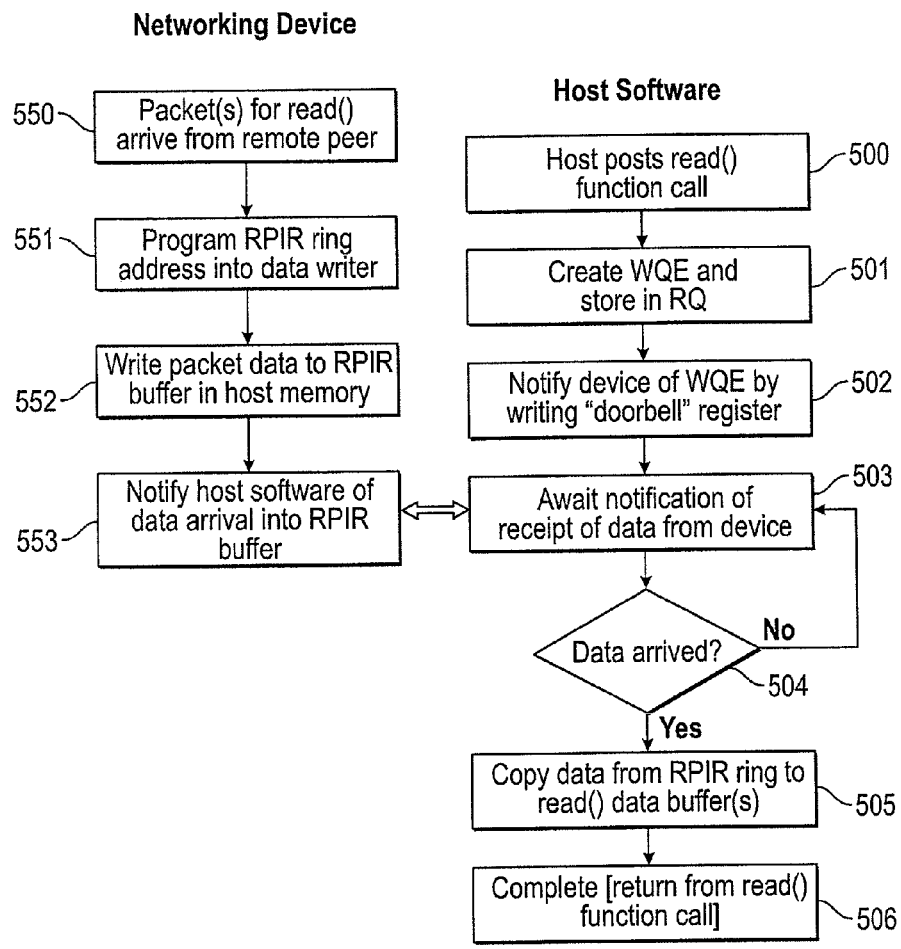
FIG. 5 illustrates exemplary RPIR process flow for an exemplary networking device and exemplary host software.

An example RPIR process flow is shown in FIG. 5. Process flow for the host software is on the right side. Host software can execute a read( ) function call in step 500, and then can create a WQE in step 501. Once the WQE has been created, the WQE can be stored in an RQ, also in step 501. Host software can ring the doorbell of the networking device in step 502 by writing to the doorbell register located in the networking device, notifying the networking device that the host software is ready to receive a data message and that a WQE has been stored in the RQ. In step 503, host software can wait for notification from the networking device that the networking device has written packet data into an RPIR in the host memory. Step 504 shows that host software can check for arrival of the packet data into the RPIR. When the packet data has arrived into the RPIR, host software can copy the packet data from the RPIR to the posted receive buffer in step 505. The user mode application can access the packet data from the posted receive buffer. Step 506 shows completion with return from read( ) function call.

Process flow for the networking device is on the left side. Packet data (e.g., a small data message) for the read( ) function can arrive at the networking device from a remote peer in step 550. In step 551, the networking device can program a target RPIR ring address into its data writer for the packet data. In step, 552, the networking device can write the packet data directly into the corresponding RPIR buffer in the host memory. In step 553, the networking device can notify host software of the arrival of the packet data into the RPIR in the host memory.

In FIG. 5, the process flow for the networking device and the process flow for the host software can interface with each other at steps 503 and 553.

In contrast to a BDR process (e.g., as for a large message), the RPIR process flow for host software may have an extra step—step 505. This extra step may introduce a copy latency, but this copy latency can be relatively small when compared to the latency reduction enabled by the RPIR process flow the networking device. For example, the RPIR process flow for the networking device can bypass multiple steps under the BDR process: fetching a WQE from an RQ in host memory, performing address translation on VSGE(s) in the fetched WQE to obtain PBL address(es) in host memory, fetching PBL(s) from host memory, extracting host data buffer physical address(es) from the fetched PBL(s), and programming the extracted host data buffer physical address(es) into the data writer. Instead, the RPIR process flow for the networking device can replace these multiple BDR steps with step 551— programming a RPIR ring address into its data writer.

Even though the RPIR process flow may have comparatively lower latency than the BDR process flow, examples of this disclosure may utilize both RPIR process flow and BDR process flow in a way that improves the efficiency of resource utilization. For instance, a single RQ may have WQEs for both large and small messages. A large message may be subject to a BDR process, and a small message may be subject to a RPIR process.

In another example, the WQEs can be created and prepared by a kernel mode application. Kernel mode differs from user mode in that the computer processing unit has complete and unrestricted access to physical memory, so virtual addresses are not needed. For example, kernel mode applications can be used when security is not a concern. In kernel mode applications, the kernel can prepare the WQE and, due to the accessibility of the physical address space, VSGEs, address protection checks, address translations, and PBL fetches can be eliminated. The RPIR can still be relevant and beneficial to kernel mode application because the RPIR can further render it unnecessary for the networking device to perform the WQE fetch and processing.

In another example; the RPIR data buffer and RQ can be overlaid in host physical memory 600 as shown in FIG. 6, which can be used in examples when pinned memory resources are scarce, such as in large cluster high-performance computing applications, and data packet sizes are less than or equal to the RQ data buffer size. This example can allow for zero host memory overhead and less memory consumption due to the reduced number of queues utilized.

The example process flow in FIG. 5 may also apply for the example in FIG. 6. The host software 620 can execute a function call 621. The host software 620 can then create a WQE entry 602/603/604 and write to the doorbell register 611 located internally in the networking device 610.

If an incoming data message is directed to an RPIR process, the networking device 610 can overwrite the message's associated WQE (e.g., 603) in the RQ 601. The message data can be written directly to the RPIR using the data writer 614, as shown by arrow 633. The host software 620 can write a copy of the packet data to a posted receive buffer 608, which the application can access.

If a large message is directed to a BDR process, the networking device 610 can perform a read of the RQ 601 using the queue reader 612, shown by arrow 630. Based on the large message's associated WQE (e.g., 602 or 604) read from the RQ 601, the VSGE(s) of the WQE can be processed. The VSGE(s) contains a virtual address that points to a virtual buffer 605 located in virtual address space. The virtual buffer 605 can then point to PBLs 606 located in host physical memory 600. The networking device 610 can then perform a read on the PBLs 606 using the memory location reader 613, shown by arrow 631, and then a write to the RDBs 607 using the data writer 614, shown by arrow 632. If the function call was executed by a kernel mode application, the VSGEs, virtual addresses, virtual buffer 605, and PBL read shown by arrow 631 can be eliminated.

FIG. 7 illustrates an exemplary networking system 700 that can be used with one or more examples of this disclosure. Networking system 700 may include host 770, device 780, and network 790. Host 770 may include a computer, a server, a mobile device, or any other devices having host functionality. Device 780 may include a network interface controller (NIC) (similarly termed as network interface card or network adapter), such as an Ethernet card, a host bus adapter (as for Fibre Channel), a converged network adapter (CNA) (as for supporting both Ethernet and Fibre Channel), or any other device having networking device functionality. Network 790 may include a router, a switch, transmission medium, and other devices having some network functionality.

Host 770 may include one or more host logic 772, a host memory 774, an interface 778, interconnected by one or more host buses 776. The functions of the host in the examples of this disclosure may be implemented by host logic 772, which can represent any set of processors or circuitry performing the functions. Host 770 may be caused to perform the functions of the host in the examples of this disclosure when host logic 772 executes instructions stored in one or more machine-readable storage media, such as host memory 774. Host 770 may interface with device 780 via interface 778.

Device 780 may include one or more device logic 782, a device memory 784, interfaces 788 and 789, interconnected by one or more device buses 786. The functions of the networking device in the examples of this disclosure may be implemented by device logic 782, which can represent any set of processors or circuitry performing the functions. Device 780 may be caused to perform the functions of the networking device in the examples of this disclosure when device logic 782 executes instructions stored in one or more machine-readable storage media, such as device memory 784. Device 780 may interface with host 770 via interface 788 and with network 790 via interface 789. Device 780 may be a CPU, a system-on-chip (SoC), a NIC inside a CPU, a processor with network connectivity, an HBA, a CNA, or a storage device (e.g., a disk) with network connectivity.

Applications for the one or more examples of the disclosure can include, but are not limited to, desktop computers, data centers, high performance computing applications, and message based applications. Although examples disclosed herein may be described and illustrated in terms of a single receive queue for a single network connection, it should be understood that the examples are not so limited, but are additionally applicable to multiple receive queues for single and multiple connections or single receive queues (SRQs) by multiple connections.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A networking device for interfacing with a host memory, the networking device comprising:
a logic; the logic comprising:
an interface configured to receive a first data and a second data, the size of the first data being larger than the size of a buffer element, the size of the second data being the size of the buffer element or smaller;
a queue reader configured to read a first queue entry from a receive queue in the host memory, the first queue entry comprising a virtual address of a virtual buffer, the virtual buffer corresponding to a physical buffer list in a physical memory, the physical buffer list corresponding to a plurality of data buffers in an unpinned memory in the host memory; and
a data writer configured to write the first data to the plurality of data buffers in the unpinned memory in the host memory in response to the first queue entry, wherein the data writer is further configured to write the second data to a pinned memory in the host memory.

2. The networking device of claim 1, wherein the pinned memory is a data buffer queue, wherein the data writer is configured to write the second data to the data buffer queue at a data buffer queue element corresponding to a second queue entry of the receive queue.

3. The networking device of claim 1, wherein the pinned memory is the receive queue, wherein the data writer is configured to write the second data to the receive queue.

4. A networking adapter incorporating the networking device of claim 1.

5. A host incorporating the networking adapter of claim 4.

6. A network incorporating the host of claim 5.

7. A host for interfacing with a networking device, the host comprising: a logic; the logic comprising:
a receive queue configured to store a first queue entry to be read by a queue reader of the networking device, the first queue entry comprising a virtual address of a virtual buffer, the virtual buffer corresponding to a physical buffer list in a physical memory, the physical buffer list corresponding to a plurality of buffer elements;
an unpinned memory configured to store a first data in the plurality of buffer elements, the first data associated with the first queue entry, the size of the first data being larger than the size of a buffer element; and
a pinned memory configured to store a second data from the networking device, the size of the second data being the size of the buffer element or smaller, wherein the logic is configured to write the second data to another unpinned memory.

8. The host of claim 7, wherein the pinned memory is a data buffer queue, wherein the data buffer queue is configured to store the second data from the networking device at a data buffer queue element corresponding to a second queue entry of the receive queue.

9. The host of claim 7, wherein the pinned memory is the receive queue, wherein receive queue is further configured to store the second data from the networking device.

10. A network incorporating the host of claim 7.

11. A method for interfacing with a host memory, comprising:
- receiving a first data and a second data, the size of the first data being larger than the size of a buffer element, the size of the second data being the size of the buffer element or smaller;
- reading a first queue entry from a receive queue in the host memory, the first queue entry comprising a virtual address of a virtual buffer, the virtual buffer corresponding to a physical buffer list in a physical memory, the physical buffer list corresponding to a plurality of buffer elements in the unpinned memory in the host memory;
- writing the first data to the plurality of buffer elements in the unpinned memory in the host memory in response to the read first queue entry; and
- writing the second data to a pinned memory in the host memory.

12. The method of claim 11, wherein the pinned memory is a data buffer queue,
- wherein the writing the second data to the pinned memory in the host memory includes writing the second data to the data buffer queue at a data buffer queue element corresponding to a second queue entry of the receive queue.

13. The method of claim 11, wherein the pinned memory is the receive queue, wherein the writing the second data to the pinned memory in the host memory includes writing the second data to the receive queue.

14. A non-transitory machine-readable medium for an apparatus, the medium storing instructions that, when executed by one or more processors, cause the apparatus to perform a method comprising:
- storing a first queue entry in a receive queue configured to be read by a queue reader of a networking device, the first queue entry comprising a virtual address of a virtual buffer, the virtual buffer corresponding to a physical buffer list in a physical memory, the physical buffer list corresponding to a plurality of buffer elements in the unpinned memory in the host memory;
- storing a first data from the networking device in the plurality of buffer elements in the unpinned memory, the first data associated with the first queue entry, the size of the first data being larger than the size of a buffer element;
- storing a second data from the networking device in a pinned memory, the size of the second data being the size of the buffer element or smaller; and
- writing the second data to another unpinned memory.

15. The non-transitory machine-readable medium of claim 14, wherein the pinned memory is a data buffer queue,
- wherein the storing the second data from the networking device in the pinned memory includes storing the second data from the networking device in the data buffer queue at a data buffer queue element corresponding to a second queue entry of the receive queue.

16. The non-transitory machine-readable medium of claim 14, wherein the pinned memory is the receive queue,
- wherein storing the second data from the networking device in the pinned memory includes storing the second data from the networking device in the receive queue.

* * * * *